(12) United States Patent
Meserth et al.

(10) Patent No.: US 9,778,708 B1
(45) Date of Patent: Oct. 3, 2017

(54) DUAL SIDED LATCHING RETAINER FOR COMPUTER MODULES

(71) Applicant: LENOVO ENTERPRISE SOLUTIONS (SINGAPORE) PTE. LTD., Singapore (SG)

(72) Inventors: Timothy A. Meserth, Durham, NC (US); Paul A. Wormsbecher, Apex, NC (US); Yi-Lung Wu, New Taipei (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/212,620

(22) Filed: Jul. 18, 2016

(51) Int. Cl.
*H05K 1/00* (2006.01)
*G06F 1/18* (2006.01)
*H01R 12/73* (2011.01)

(52) U.S. Cl.
CPC ........... *G06F 1/185* (2013.01); *H01R 12/732* (2013.01)

(58) Field of Classification Search
USPC .................... 361/748, 679.01, 720
See application file for complete search history.

(56) References Cited

U.S. PATENT DOCUMENTS

| | | | |
|---|---|---|---|
| 7,471,517 B1* | 12/2008 | Desrosiers | H01L 23/4006 165/185 |
| 2005/0196109 A1* | 9/2005 | Kim | G02B 6/4292 385/92 |

OTHER PUBLICATIONS

Anandtech, "Asus x99 Deluxe M.2", image, 1 page, AnandTech.com (online), accessed Jun. 6, 2016, URL: http://images.anandtech.com/doci/8557/ASUS%20X99-Deluxe%20M2-1.jpg.

* cited by examiner

*Primary Examiner* — Andargie M Aychillhum
(74) *Attorney, Agent, or Firm* — Brandon C. Kennedy; Jason A. Friday; Kennedy Lenart Spraggins LLP

(57) ABSTRACT

Dual sided latching retainers including a latching mechanism fixing the dual sided latching retainer to a computer board assembly; a first module retention feature configured to receive a first computer module held between the first module retention feature and a first module support surface, wherein the first module retention feature holds the first computer module against a first side of the computer board assembly; a second module retention feature configured to receive a second computer module held between the second module retention feature and a second module support surface, wherein the second module retention feature holds the second computer module against a second side of the computer board assembly.

15 Claims, 9 Drawing Sheets

DUAL SIDED LATCHING RETAINER FOR COMPUTER MODULES

BACKGROUND

Field of the Invention

The field of the invention is data processing, or, more specifically, methods, apparatus, and products for a dual sided latching retainer for computer modules.

Description of Related Art

Internally mounted removable computer expansion cards allow computer modules to be easily replaced. These expansion cards (also referred to as computer modules), such as M.2 modules, must conform to a specification standard in order to maintain interchangeability of the computer modules. However, the standardization and elements required for interchangeability increase the internal space required to host the computer modules, relative to computer components directly connected to a motherboard.

Related art includes a module connector configured to receive the edge connector of a computer module, such as an M.2 module. The opposite end of the computer module is secured to a motherboard using a mounting screw through a semicircular mounting hole on the computer module.

SUMMARY

Dual sided latching retainers are disclosed in this specification. Such dual sided latching retainers include a latching mechanism fixing the dual sided latching retainer to a computer board assembly; a first module retention feature configured to receive a first computer module held between the first module retention feature and a first module support surface, where the first module retention feature holds the first computer module against a first side of the computer board assembly; a second module retention feature configured to receive a second computer module held between the second module retention feature and a second module support surface, where the second module retention feature holds the second computer module against a second side of the computer board assembly; where the first computer module is operatively connected to a first side of the computer board assembly via a first module connector, and where the second computer module is operatively connected to a second side of the computer board assembly via a second module connector. For purposes of clarity of explanation, the term 'first' as used above is often referred to in this specification as 'top' while the term 'second' is often referred to as 'bottom.' For example, the "first" module retention feature mentioned above may be referred to as a "top" module retention feature in the specification and associated drawings while the "second" module retention feature may be referred to as a "bottom" module retention feature. Readers will understand that the terms 'top' and 'bottom' are used only for clarity of explanation rather than requiring a particular orientation.

Injection molds utilized to manufacture such dual sided latching retainers include a cavity configured to receive liquid, injected material, where the cavity has a shape defined by a dual sided latching retainer for computer modules.

Methods of manufacturing such dual sided latching retainers include: receiving source material in a solid state; heating the source material into a liquid state; and injecting the liquid source material into a mold cavity, the mold cavity having a shape defined by a dual sided latching retainer for computer modules.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
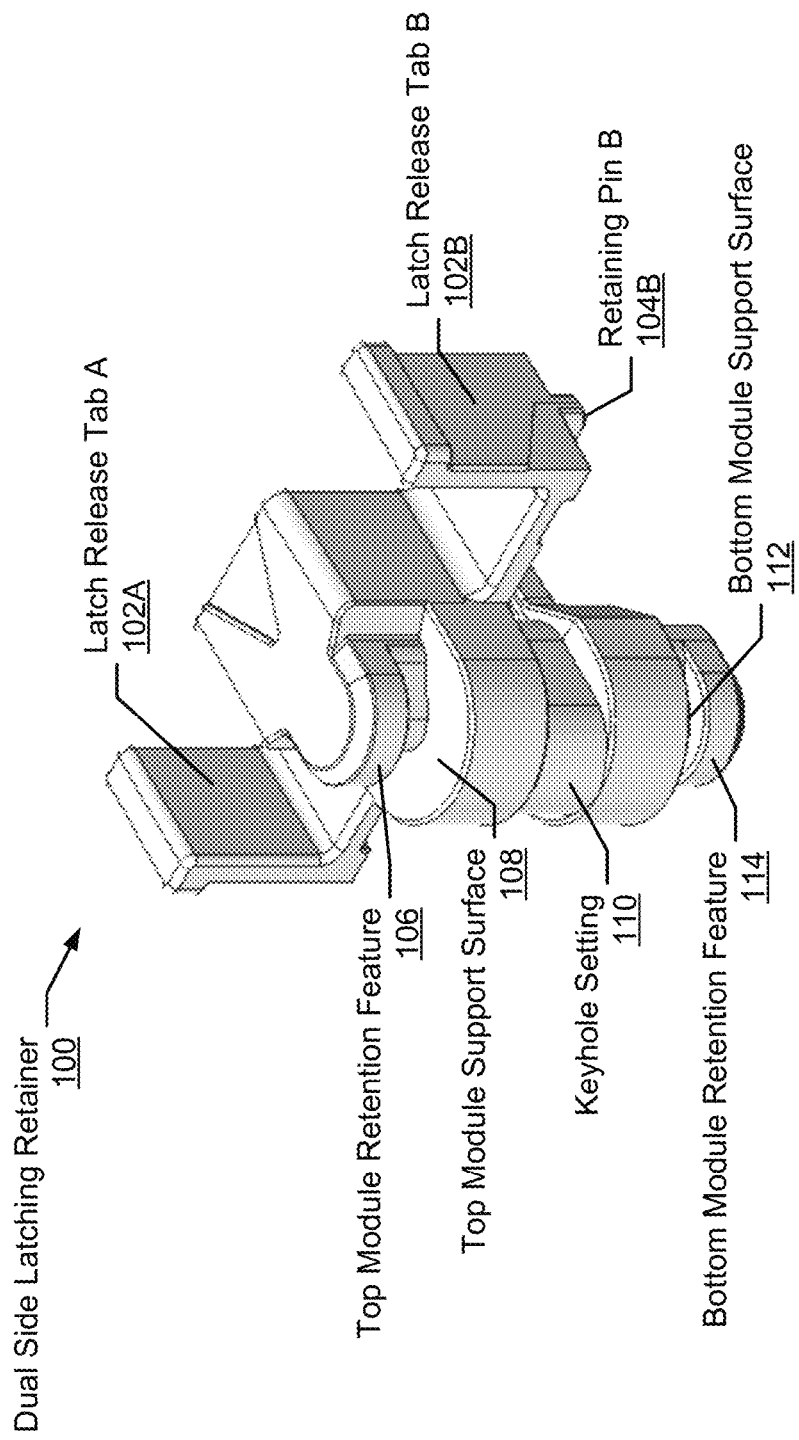
FIG. 1 sets forth an isometric view of an example dual sided latching retainer for computer modules according to embodiments of the present disclosure.
Figure 2:
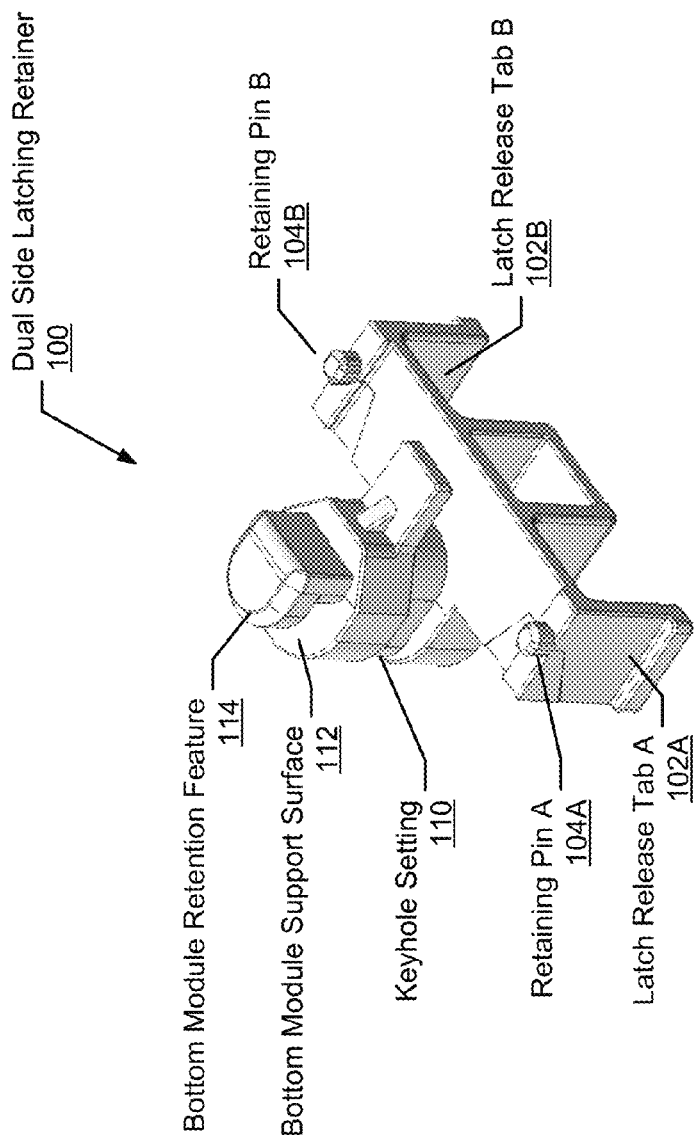
FIG. 2 depicts another isometric view of an example dual sided latching retainer for computer modules in accordance with embodiments of the present disclosure.
Figure 3:
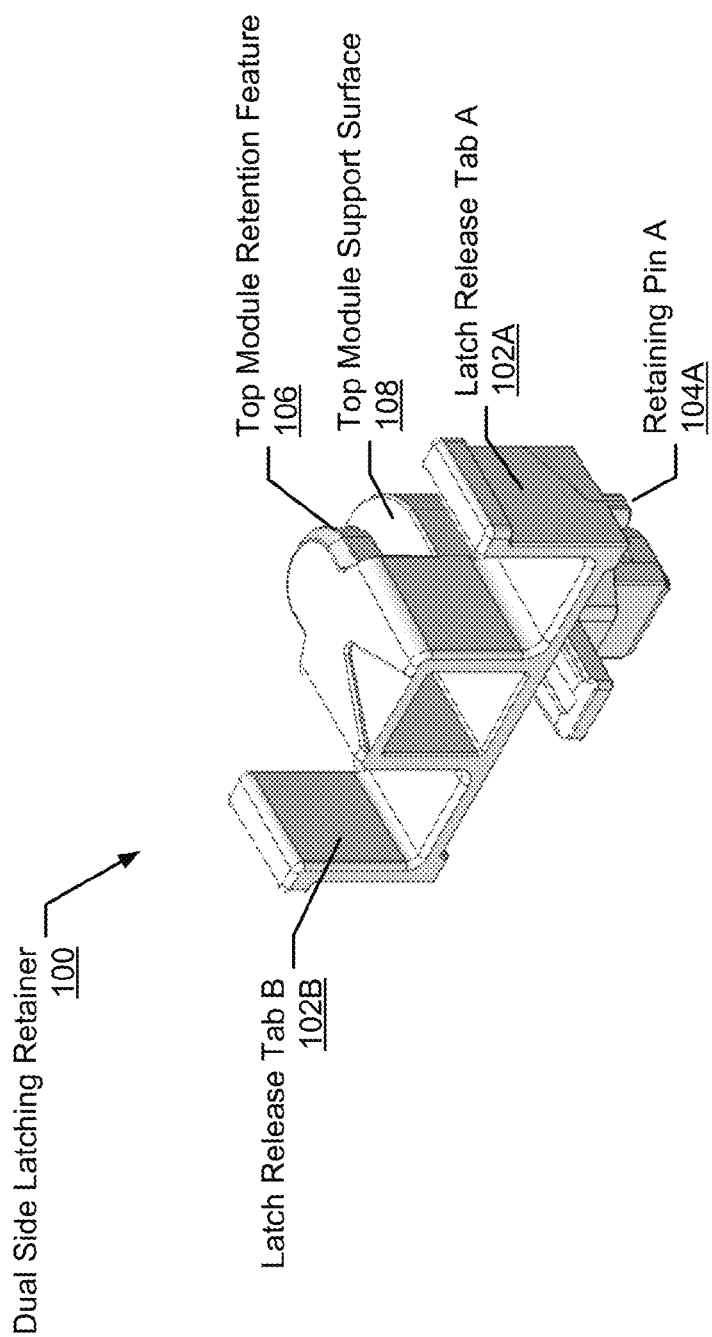
FIG. 3 depicts another isometric view of an example dual sided latching retainer for computer modules in accordance with embodiments of the present disclosure.

Example products for a dual sided latching retainer for computer modules in accordance with the present disclosure are described with reference to the accompanying drawings, beginning with FIGS. 1-3. FIGS. 1-3 set forth isometric views of an example dual sided latching retainer (100) according to embodiments of the present disclosure. The dual sided latching retainer (100) may be a component of a computer system configured to aid in holding removable computer modules in place while maintaining the removability of the computer modules. The dual sided latching retainer (100) may be configured to hold two removable computer modules in place simultaneously, one on each side of a computer board assembly.

As used herein, the terms "bottom" and "top" refer to opposite ends of an element, and are used to distinguish one element from another based on relative location. The terms are not intended to limit any orientation of those elements.

The computer module (such as the top computer module (600A) and bottom computer module (600B) in FIGS. 6-9) may include an edge connector on one side of the computer module and a semicircular mounting hole on the opposite side of the connector. The computer module may conform to standard sizes, interfaces, and pin configurations. Such standards include the Peripheral Component Interconnect (PCI) Express standard, the Serial Advanced Technology Attachment (SATA) standard, the mini SATA standard, and the M.2 standard. The computer module may be a storage device, such as a solid state disk.

The dual sided latching retainer (100) may be placed in one of at least two positions, including an opened position and a locked position. In the opened position, each computer module is not held in place by the dual sided latching retainer (100), and may be removed from the computer board assembly. In the locked position, each computer module is held in place by the dual sided latching retainer (100) so as to not be easily removed from the computer board assembly.

The example dual sided latching retainer (100) of FIGS. 1-3 includes a top module retention feature (106), a bottom module retention feature (114), a top module support surface (108), a bottom module support surface (112), and a latching mechanism.

In entering a locked position, the top module retention feature (106) is configured to receive a top computer module held between the top module retention feature (106) and the top module support surface (108). The top module retention feature (106) holds the top computer module against the top of the computer board assembly. Similar to the top module retention feature (106), in entering the locked position, the bottom module retention feature (114) is configured to receive a bottom computer module held between the bottom module retention feature (114) and the bottom module support surface (112). The bottom module retention feature (114) holds the bottom computer module against the bottom of the computer board assembly.

The top module retention feature (106) and the bottom module retention feature (114) partially extend over the corresponding top module support surface (108) and bottom module support surface (112). In the locked position, the top module retention feature (106) will extend over a portion of the top computer module (such as a portion of a semicircular mounting hole), such that the portion of the top computer module is between the top module retention feature (106) and the computer board assembly. Similarly, in the locked position, the bottom module retention feature (114) will extend under a portion of the bottom computer module (such as a portion of a semicircular mounting hole), such that the portion of the bottom computer module is between the bottom module retention feature (114) and the computer board assembly. In the opened position, the top module retention feature (106) and the bottom module retention feature (114) do not impede (or minimally impede) the computer modules from moving away from the computer board assembly.

The top module support surface (108) and the bottom module support surface (112) are configured to support a portion of the computer module (such as a portion of a semicircular mounting hole) in both the locked position and the opened position. The top module support surface (108) will support a portion of the top computer module (such as a portion of a semicircular mounting hole), such that the top module support surface (108) is between the portion of the computer module and the computer board assembly. Similarly, the bottom module support surface (112) will support a portion of the bottom computer module (such as a portion of a semicircular mounting hole), such that the bottom module support surface (112) is between the portion of the computer module and the computer board assembly.

The latching mechanism is an element or group of elements of the dual sided latching retainer (100) configured to fix the dual sided latching retainer (100) to a computer board assembly. The latching mechanism may further fix the dual sided latching retainer (100) in one position, such as the locked position. The example latching mechanism depicted in FIGS. 1-3 includes two latch release tabs (latch release tab A (102A), latch release tab B (102B)) and two retaining pins (retaining pin A (104A) (shown in FIGS. 2 and 3), retaining pin B (104B)).

The latch release tabs (latch release tab A (102A), latch release tab B (102B)) are configured to enable the dual side latching retainer (100) to be removed from a computer board assembly. Specifically, each latch release tab (latch release tab A (102A), latch release tab B (102B)) may include a retaining pin (retaining pin A (104A), retaining pin B (104B)). Applying inward force to a latch release tab ((latch release tab A (102A), latch release tab B (102B)) may cause the portion of the latch release tab ((latch release tab A (102A), latch release tab B (102B)) that includes the retaining pin to separate from the computer board assembly, removing the retaining pin (retaining pin A (104A), retaining pin B (104B)) from a retaining pin cavity in the computer board assembly.

The keyhole setting (110) is a portion of the dual side latching retainer (100) between the top module support surface (108) and the bottom module support surface (112). The keyhole setting (110) may be configured to receive a narrow end of a keyhole cavity of the computer board assembly. The keyhole setting (110) may be a size just smaller than the narrow end of a keyhole cavity such that a keyhole setting (110) placed within the narrow end of a keyhole cavity will make contact with a portion of the wall of the keyhole cavity.

The arrangement of elements making up the example dual sided latching retainer illustrated in FIGS. 1-3 are for explanation, not for limitation. Various embodiments of the present disclosure may be implemented on a variety of ways in addition to those illustrated in FIGS. 1-3.

Figure 4:
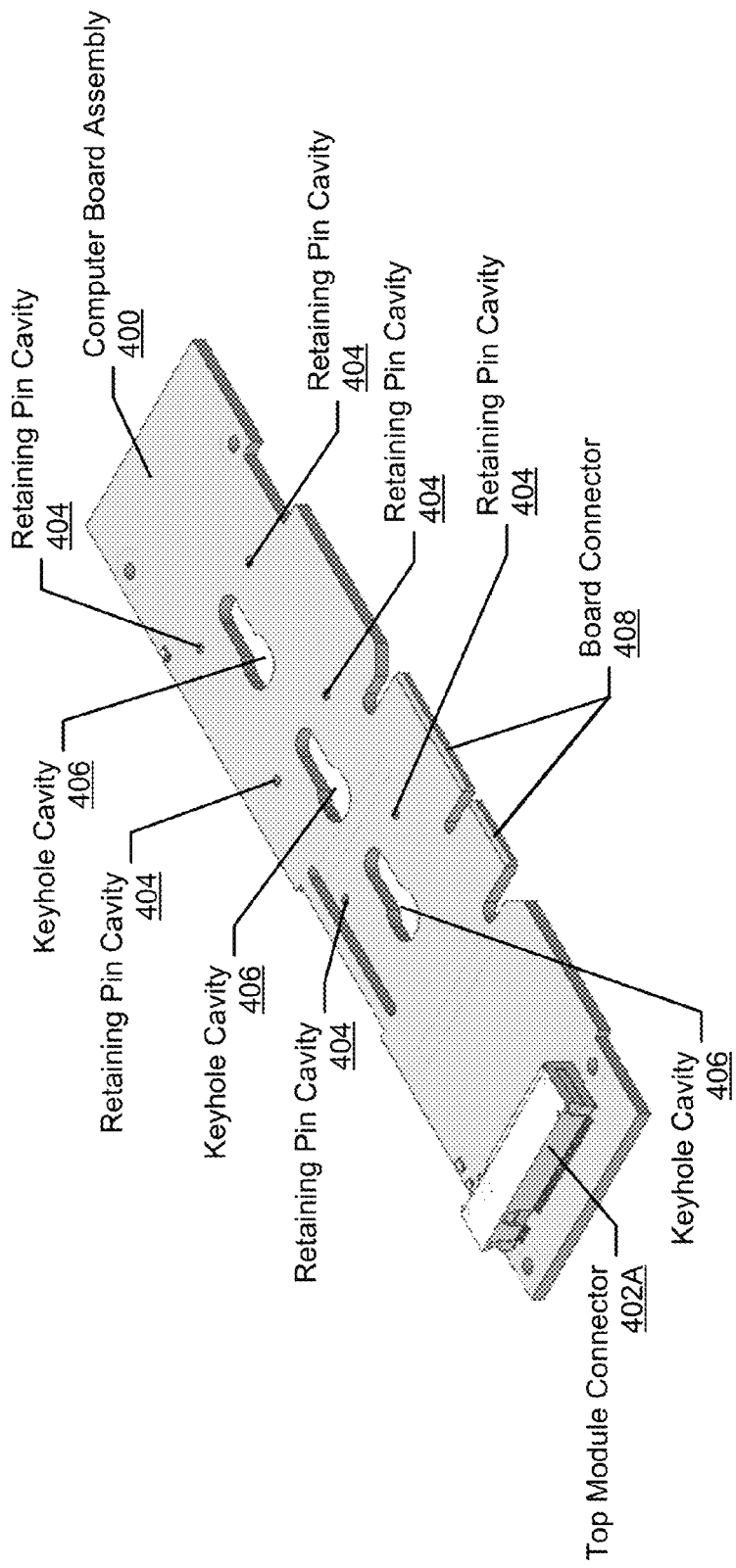
FIG. 4 depicts a isometric view of an example computer board assembly in accordance with embodiments of the present disclosure.
Figure 5:
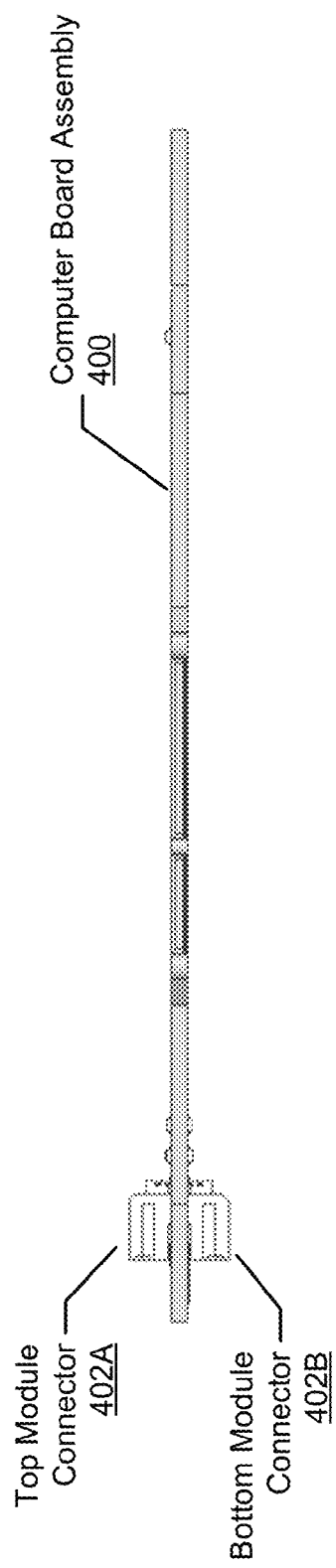
FIG. 5 depicts a side view of an example computer board assembly in accordance with embodiments of the present disclosure.

For further explanation, FIGS. 4 and 5 depict a computer board assembly (400) configured to receive a dual sided latching retainer (100). The example computer board assembly (400) includes a top module connector (402A) and a bottom module connector (402B), multiple retaining pin cavities (404), multiple keyhole cavities (406), and a board connector (408).

The computer board assembly (400) may be a printed circuit board that communicatively couples the top module connector (402A) and the bottom module connector (402B) to other computer components, such as the board connector (408). The computer board assembly (400) may be the main printed circuit board (i.e., the motherboard) of a computer system. Alternatively, the computer board assembly (400) may be configured for communicative coupling to another component of a computer system (e.g., using the board connector (408)).

The top module connector (402A) and the bottom module connector (402B) are mating connectors for the computer modules. The top module connector (402B) may be attached to the top of the computer board assembly (400) and configured to receive a top computer module. The bottom module connector (402B) may be attached to the bottom of the computer board assembly (400) and configured to receive a bottom computer module. The top module connector (402A) and the bottom module connector (402B) may be mating connectors configured to receive the edge connector of a computer module, such as an M.2 computer module. The top module connector (402A) and the bottom module connector (402B) may be placed in the same location on opposite sides of the computer board assembly (400)

and oriented in the same direction. The top module connector (402A) and the bottom module connector (402B) may be arranged such that a top computer module and a bottom computer module, when placed in the corresponding module connectors, mirror one another on each side of the computer board assembly.

Each keyhole cavity (406) is configured to receive a dual sided latching retainer (100). Each keyhole cavity (406) may include two ends, an open end and a narrow end. The keyhole cavity (406) may be oriented such that the narrow end is further from the module connectors (top module connector (402A) and the bottom module connector (402B)) than the open end.

Each keyhole cavity (406) may be configured to accommodate a different sized computer module. Specifically, one keyhole cavity may be placed to receive a dual sided latching retainer (100) that holds a pair of computer modules of one size, and another keyhole cavity may be placed to receive a dual sided latching retainer (100) that holds a pair of computer modules of another size. For example, one keyhole cavity (406) may be placed to accommodate a pair of computer modules that are 42 mm in length, another to accommodate a pair of computer modules that are 60 mm in length, another to accommodate a pair of computer modules that are 80 mm in length, and another to accommodate a pair of computer modules that are 110 mm in length.

Each retaining pin cavity (404) is configured to receive a retaining pin (retaining pin A (104A), retaining pin B (104B)) of the dual sided latching retainer (100). Each retaining pin cavity (404) (or set of retaining pin cavities) may be placed to fix the dual sided latching retainer (100) in one position (such as the locked position) and in one location within the keyhole cavity (406) (such as the open end of the keyhole cavity (406)). The retaining pin cavities (404) may extend partially or completely through the computer board assembly (400).

The example computer board assembly of FIGS. 4 and 5 also includes a board connector (408). The board connector (408) may be configured to communicatively couple the computer board assembly (400) to a computer system. The board connector (408) may be a set of tabs configured to be inserted in corresponding receptacles in a computer system. The board connector (408) may be a cable receptacle or a cable directly attached to the computer board assembly (400).

Figure 6:
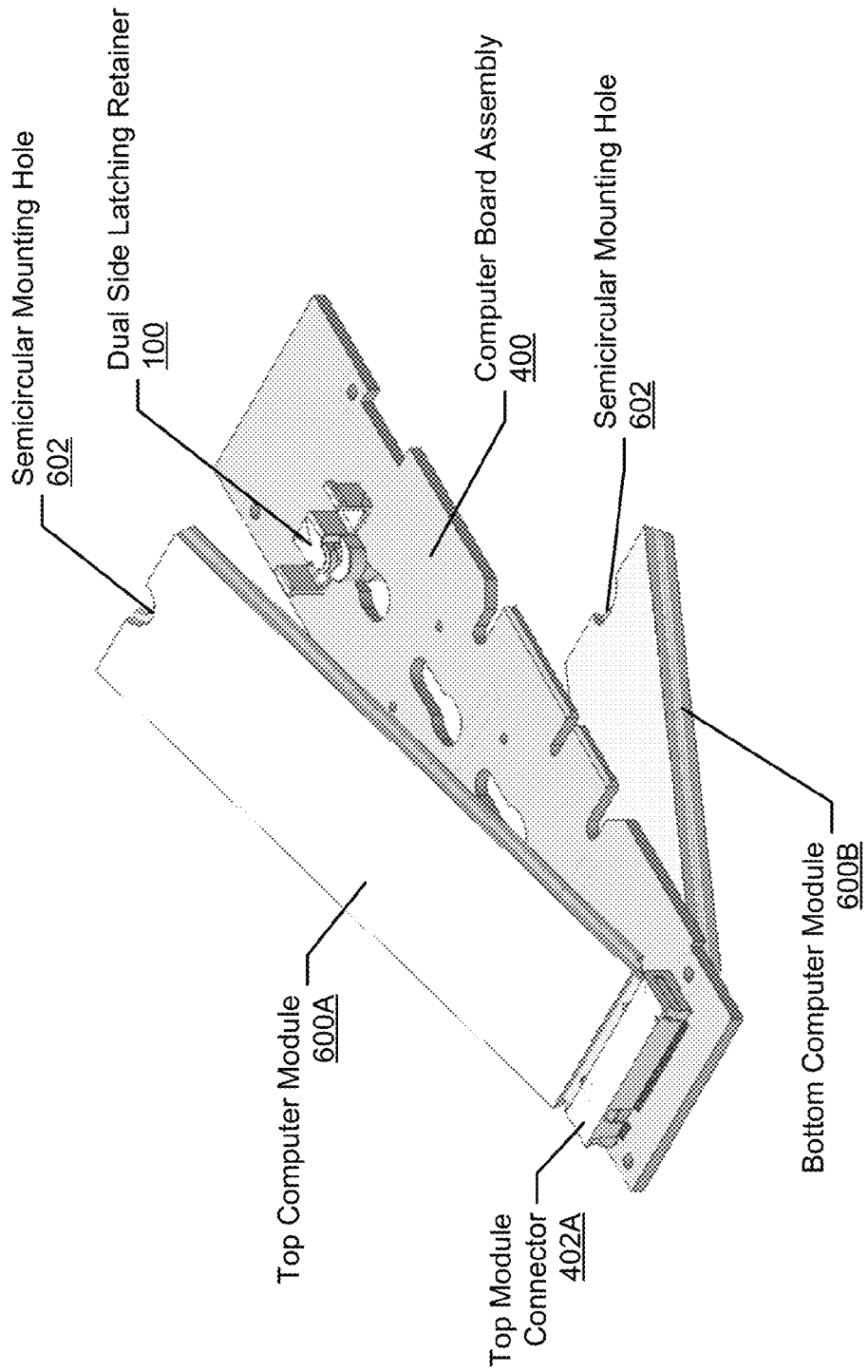
FIG. 6 depicts a isometric view of an example dual sided latching retainer for computer modules installed in a computer board assembly in accordance with embodiments of the present disclosure.
Figure 7:
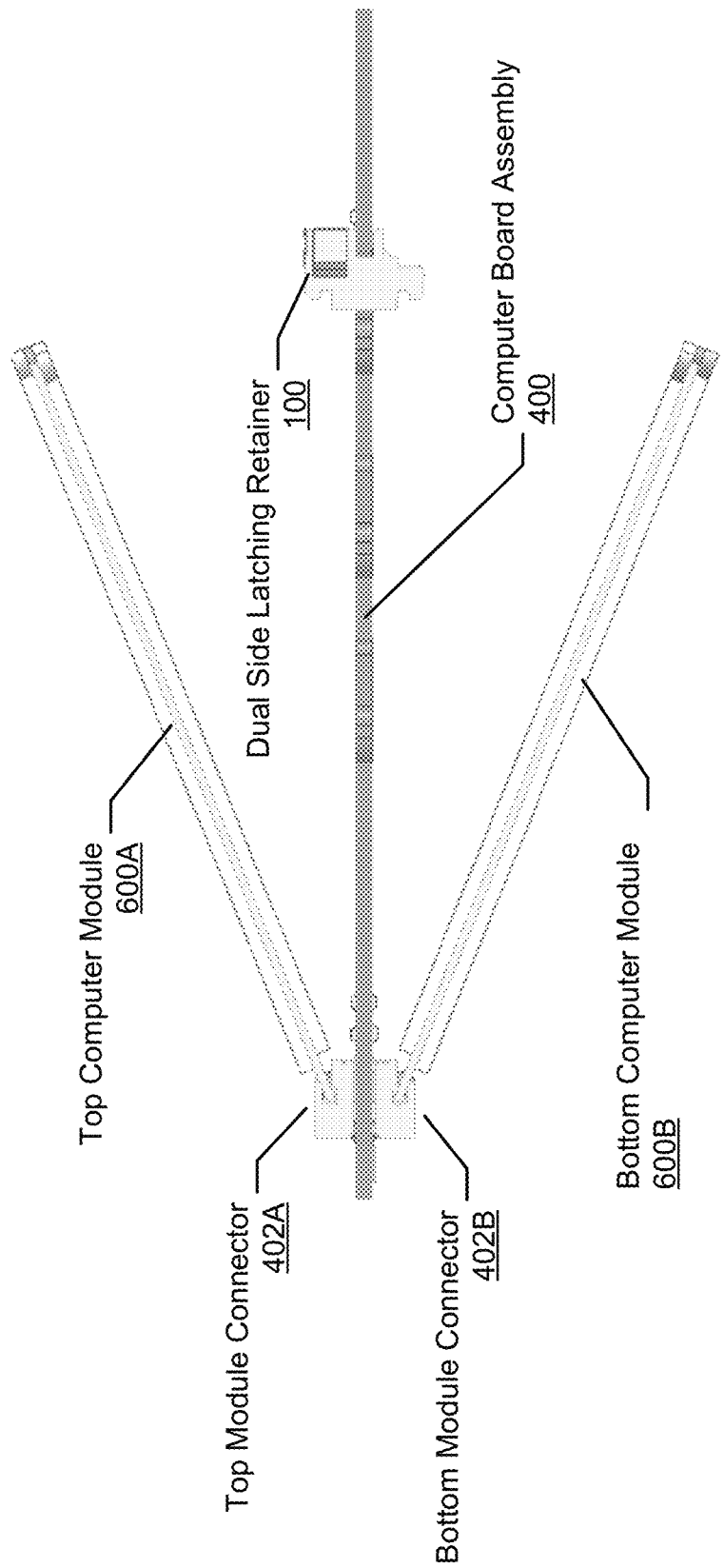
FIG. 7 depicts another side view of an example dual sided latching retainer for computer modules installed in a computer board assembly in accordance with embodiments of the present disclosure.

For further explanation, FIGS. 6 and 7 depict isometric and side views of an example dual sided latching retainer (100) installed in a computer board assembly (400) that includes a top computer module (600A) and a bottom computer module (600B) inserted into the corresponding module connectors (top module connector (402A), bottom module connector (402B)). FIGS. 6 and 7 depict the duel sided latching retainer (100) in the opened position.

The top computer module (600A) and the bottom computer module (600B) may be internally mounted computer expansion cards. As discussed above, the top computer module (600A) and the bottom computer module (600B) may conform to standard sizes, interfaces, and pin configurations. Such standards include the Peripheral Component Interconnect (PCI) Express standard, the Serial Advanced Technology Attachment (SATA) standard, the mini SATA standard, and the M.2 standard.

The top computer module (600A) and the bottom computer module (600B) may include solid state storage devices. Further, the top computer module (600A) and the bottom computer module (600B) may operate together to perform a task. For example, the top computer module (600A) may store data related to hypervisor operations for a computer system, and the bottom computer module (600B) may act as a backup or failsafe to the data stored on the top computer module (600A). As another example, the top computer module (600A) and the bottom computer module (600B) may operate together as a redundant array of independent disks (RAID) storage unit.

Different sizes of computer modules (top computer module (600A), bottom computer module (600B)) may be installed on the computer board assembly (400) by installing the duel sided latching retainer (100) in different keyhole cavities. Different keyhole cavities may accommodate different sizes of computer modules (top computer module (600A), bottom computer module (600B)). Such varied sizes include lengths of 42 mm, 60 mm, 80 mm and 110 mm. Each pair of computer modules (top computer module (600A), bottom computer module (600B)) installed on the computer board assembly (400) may be the same length.

Each computer module (top computer module (600A), bottom computer module (600B)) may include a semicircular mounting hole (602). The semicircular mounting hole (602) may be configured for attachment to a computer board assembly (400) using a mounting screw. However, the duel sided latching retainer (100) may utilize the semicircular mounting hole (602) to hold the computer module against the computer board assembly (400) without the use of a mounting screw.

Figure 8:
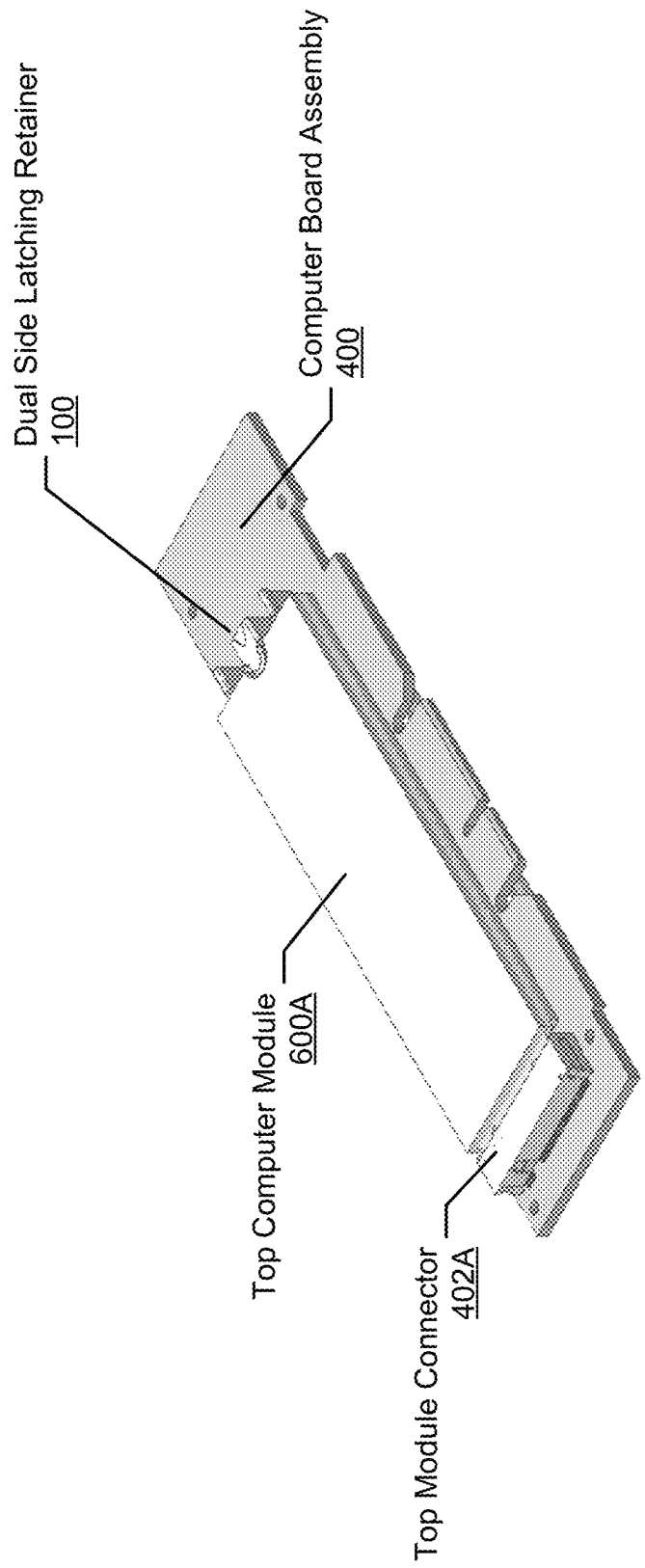
FIG. 8 depicts another isometric view of an example dual sided latching retainer for computer modules installed in a computer board assembly in accordance with embodiments of the present disclosure.
Figure 9:
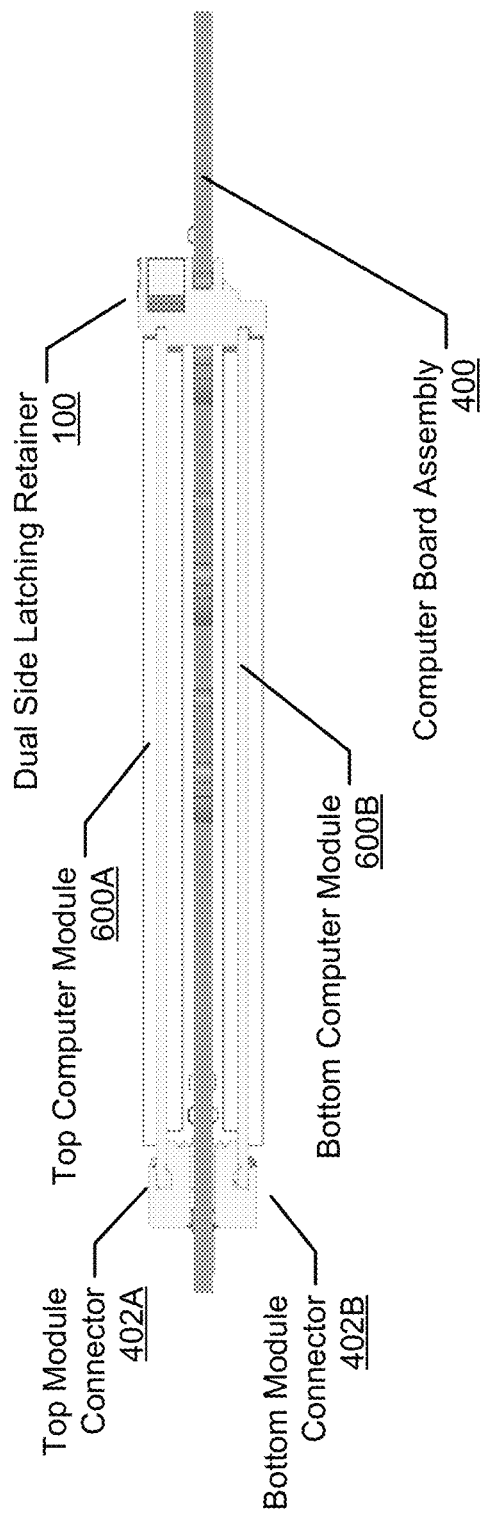
FIG. 9 depicts a section view of an example dual sided latching retainer for computer modules installed in a computer board assembly in accordance with embodiments of the present disclosure.

For further explanation, FIGS. 8 and 9 depict isometric and section views of an example dual sided latching retainer (100) installed in a computer board assembly (400) that includes a top computer module (600A) and a bottom computer module (600B) inserted into the corresponding module connectors (top module connector (402A), bottom module connector (402B)). FIGS. 8 and 9 depict the duel sided latching retainer (100) in the locked position.

An injection mold may be used in manufacturing a dual sided latching retainer for computer modules in accordance with embodiments of the present disclosure. An example injection mold may include three portions: a top, a bottom, and slides. The top side is configured to be placed on the bottom side. The slides are then configured to be inserted within the slide cavities. When all parts placed and installed, the injection mold forms a cavity. The cavity is configured to receive liquid, injected material and has a shape defined by a dual sided latching retainer. That is, the cavity defines the outer dimension of a dual sided latching retainer that includes: a latching mechanism fixing the dual sided latching retainer to a computer board assembly; a top module retention feature configured to receive a top computer module held between the top module retention feature and a top module support surface, wherein the top module retention feature holds the bottom computer module against a top of the computer board assembly; a bottom module retention feature configured to receive a bottom computer module held between the bottom module retention feature and a bottom module support surface, wherein the bottom module retention feature holds the bottom computer module against a bottom of the computer board assembly; wherein the top computer module is operatively connected to a top side of the computer board assembly via a top module connector, and wherein the bottom computer module is operatively connected to a bottom side of the computer board assembly via a bottom module connector.

Three-dimensional printing techniques may be used in manufacturing a dual sided latching retainer for computer modules in accordance with embodiments of the present disclosure. Such three-dimensional printing techniques may include fused deposition modeling, stereo lithography, multi jet printing, and stereo laser sintering.

In view of the explanations set forth above, readers will recognize that the benefits of dual sided latching retainer for computer modules in accordance with embodiments of the present disclosure include:
- attaching a pair of removable computer modules to both sides of a computer board assembly;
- reducing the space necessary to install a pair of computer modules on a computer board assembly;
- fixing computer modules to a computer board assembly without the need for a mounting screw;
- others as will occur to readers of skill in the art.

It will be understood from the foregoing description that modifications and changes may be made in various embodiments of the present disclosure without departing from its true spirit. The descriptions in this specification are for purposes of illustration only and are not to be construed in a limiting sense.

What is claimed is:

1. A dual sided latching retainer comprising:
    a latching mechanism fixing the dual sided latching retainer to a computer board assembly;
    a first module retention feature configured to receive a first computer module held between the first module retention feature and a first module support surface, wherein the first module retention feature holds the first computer module against a first side of the computer board assembly;
    a second module retention feature configured to receive a second computer module held between the second module retention feature and a second module support surface, wherein the second module retention feature holds the second computer module against a second side of the computer board assembly;
    wherein the first computer module is operatively connected to the first side of the computer board assembly via a first module connector, and wherein the second computer module is operatively connected to the second side of the computer board assembly via a second module connector.

2. The dual sided latching retainer of claim 1, wherein the latching mechanism enables the dual side latching retainer to be removed from the computer board assembly.

3. The dual sided latching retainer of claim 1, wherein the latching mechanism comprises:
    a retaining pin configured for insertion into a retaining pin cavity on the computer board assembly; and
    a latch release tab configured to release the retaining pin from the retaining pin cavity.

4. The dual sided latching retainer of claim 1, further comprising:
    a keyhole setting configured to receive a narrow end of a keyhole cavity of the computer board assembly.

5. The dual sided latching retainer of claim 1, wherein the computer module is an M.2 module.

6. An injection mold comprising:
    a cavity configured to receive liquid, injected material, the cavity having a shape defined by a dual sided latching retainer, the dual sided latching retainer comprising:
        a latching mechanism fixing the dual sided latching retainer to a computer board assembly;
        a first module retention feature configured to receive a first computer module held between the first module retention feature and a first module support surface, wherein the first module retention feature holds the first computer module against a first side of the computer board assembly;
        a second module retention feature configured to receive a second computer module held between the second module retention feature and a second module support surface, wherein the second module retention feature holds the second computer module against a second side of the computer board assembly;
        wherein the first computer module is operatively connected to the first side of the computer board assembly via a first module connector, and wherein the second computer module is operatively connected to the second side of the computer board assembly via a second module connector.

7. The injection mold of claim 6, wherein the latching mechanism enables the dual side latching retainer to be removed from the computer board assembly.

8. The injection mold of claim 6, wherein the latching mechanism comprises:
    a retaining pin configured for insertion into a retaining pin cavity on the computer board assembly; and
    a latch release tab configured to release the retaining pin from the retaining pin cavity.

9. The injection mold of claim 6, wherein the dual sided latching retainer further comprises:
    a keyhole setting configured to receive a tapered end of a keyhole cavity of the computer board assembly.

10. The injection mold of claim 6, wherein the computer module is an M.2 module.

11. A computer board assembly comprising:
    a first module connector attached to a first side of the computer board assembly, wherein the first module connector is configured to receive a first computer module;
    a second module connector attached to a second side of the computer board assembly, wherein the second module connector is configured to receive a second computer module;
    at least two keyhole cavities configured to receive a dual sided latching retainer configured to:
        hold the first computer module against the first side of the computer board assembly; and
        hold the second computer module against the second side of the computer board assembly.

12. The computer board assembly of claim 11, further comprising one or more retaining pin cavities configured to receive a retaining pin of the dual sided latching retainer.

13. The computer board assembly of claim 11, wherein the first module connector and the second module connector are placed in a same location on opposite sides of the computer board assembly and oriented in the same direction.

14. The computer board assembly of claim 11, further comprising a board connector configured to communicatively couple the computer board assembly to a computer system.

15. The computer board assembly of claim 11, wherein a first keyhole cavity of the at least two keyhole cavities is configured for a first size of the first computer module and the second computer module, and wherein a second keyhole cavity of the at least two keyhole cavities is configured for a second size of the second computer module and the second computer module.

* * * * *